(12) United States Patent  (10) Patent No.: US 7,377,557 B2
Shelley et al. (45) Date of Patent: May 27, 2008

(54) SCISSOR MECHANISM FOR A LATCH ASSEMBLY

(75) Inventors: Michael J. Shelley, Fauldhouse (GB); Nigel V. Spurr, Shirley (GB)

(73) Assignee: Honeywell International Inc., Morristown, NJ (US)

( * ) Notice: Subject to any disclaimer, the term of this patent is extended or adjusted under 35 U.S.C. 154(b) by 92 days.

(21) Appl. No.: 11/006,244

(22) Filed: Dec. 6, 2004

(65) Prior Publication Data

US 2006/0038407 A1  Feb. 23, 2006

Related U.S. Application Data

(60) Provisional application No. 60/603,329, filed on Aug. 20, 2004.

(51) Int. Cl.
*E05C 21/00* (2006.01)
*E05C 19/00* (2006.01)

(52) U.S. Cl. .................. 292/1; 292/DIG. 61

(58) Field of Classification Search ............ 292/1, 292/17, 32, 42, 137, 150, 163, 177, 180, 292/152, 302, 303, DIG. 61, 216, 201, DIG. 23; 267/53, 168, 275
See application file for complete search history.

(56) References Cited

U.S. PATENT DOCUMENTS

| | | | | |
|---|---|---|---|---|
| 3,065,985 A * | 11/1962 | Du Four | | 292/103 |
| 3,174,783 A * | 3/1965 | Russell | | 292/103 |
| 3,332,713 A * | 7/1967 | De Claire et al. | | 292/201 |
| 3,877,739 A * | 4/1975 | Cowen | | 292/101 |
| 4,093,289 A * | 6/1978 | Inabayashi et al. | | 292/336.3 |
| 4,109,948 A * | 8/1978 | Potter et al. | | 292/169.15 |
| 4,623,181 A * | 11/1986 | Geringer et al. | | 292/336.3 |
| 5,079,964 A * | 1/1992 | Hamada et al. | | 74/89.25 |
| 5,487,289 A * | 1/1996 | Otto et al. | | 70/279.1 |
| 5,765,884 A | 6/1998 | Armbruster | | 292/216 |
| 5,855,130 A * | 1/1999 | Rorabacher et al. | | 70/277 |
| 5,883,782 A * | 3/1999 | Thurston et al. | | 361/704 |
| 5,967,572 A * | 10/1999 | Sajfert et al. | | 292/336.3 |
| 5,975,596 A | 11/1999 | Rogers, Jr. et al. | | 292/216 |
| 6,007,118 A | 12/1999 | Arabia, Jr. et al. | | 292/216 |
| 6,308,587 B1 * | 10/2001 | Shinkawa et al. | | 74/89.25 |
| 6,441,512 B1 | 8/2002 | Jakel et al. | | 307/10.2 |
| 6,474,706 B1 | 11/2002 | Kalsi | | 292/216 |
| 6,511,107 B2 | 1/2003 | Barczynski et al. | | 292/216 |
| 6,520,548 B1 | 2/2003 | Fisher et al. | | 292/201 |
| 6,568,722 B2 | 5/2003 | Raffelsiefer et al. | | 292/216 |
| 6,575,507 B2 * | 6/2003 | Reddmann | | 292/216 |
| 6,601,883 B1 | 8/2003 | Kalsi | | 292/216 |

(Continued)

*Primary Examiner*—Carlos Lugo
(74) *Attorney, Agent, or Firm*—Kermit D. Lopez; Luis M. Ortiz; William B. Shelby

(57) ABSTRACT

A scissor apparatus for a latch assembly, which includes a spring comprising a plurality of fingers for controlling the motion one or more sliders associated with the latch assembly, and wherein the spring comprises a spring control independent of the actuation of such sliders. The fingers are generally integrated with the spring. Such a one-piece spring can be implemented as a stamped component with 2-off, 3-off or 6-off fingers to control the motion of the sliders. The stamped spring can clip onto existing latch assembly components in order to promote retention, and overcome friction with the latch assembly and return the sliders to a neutral position thereof.

19 Claims, 9 Drawing Sheets

U.S. PATENT DOCUMENTS

| | | | |
|---|---|---|---|
| 6,607,224 B2 * | 8/2003 | Hodges | 292/303 |
| 6,733,052 B2 * | 5/2004 | Perkins et al. | 292/201 |
| 6,815,113 B2 * | 11/2004 | Franklin et al. | 429/34 |
| 6,880,867 B2 * | 4/2005 | Schoen et al. | 292/216 |
| 6,948,745 B2 * | 9/2005 | Chevalier | 292/201 |
| 2002/0180274 A1 | 12/2002 | Suman | 307/10.2 |

* cited by examiner

US 7,377,557 B2

SCISSOR MECHANISM FOR A LATCH ASSEMBLY

REFERENCE TO RELATED APPLICATION

This patent application claims priority under 35 U.S.C. § 119(e) to provisional patent application Ser. No. 60/603,329 entitled "Scissor Mechanism for a Latch Assembly," which was filed on Aug. 20, 2004, the disclosure of which is incorporated herein by reference.

TECHNICAL FIELD

Embodiments are generally related to latch mechanisms. Embodiments are also related to door latch systems utilized in vehicles such as automobiles. Embodiments are additionally related to automatic latching systems.

BACKGROUND OF THE INVENTION

Latching mechanisms (i.e., "latches") are utilized in a variety of commercial and industrial applications, such as automobiles, airplanes, trucks, and the like. For example, an automotive closure, such as a door for an automobile passenger compartment, is typically hinged to swing between open and closed positions and conventionally includes a door latch that is housed between inner and outer panels of the door. The door latch functions in a well-known manner to latch the door when it is closed and to lock the door in the closed position or to unlock and unlatch the door so that the door can be opened manually.

The door latch can be operated remotely from inside the passenger compartment by two distinct operators—a sill button or electric switch that controls the locking function and a handle that controls the latching function. The door latch is also operated remotely from the exterior of the automobile by a handle or push button that controls the latching function. A second distinct exterior operator, such as a key lock cylinder, may also be provided to control the locking function, particularly in the case of a front vehicle door. Each operator is accessible outside the door structure and extends into the door structure where it is operatively connected to the door latch mechanism by a cable actuator assembly or linkage system located inside the door structure.

Vehicles, such as passenger cars, are therefore commonly equipped with individual door latch assemblies, which secure respective passenger and driver side doors to the vehicle. Each door latch assembly is typically provided with manual release mechanisms or lever for unlatching the door latch from the inside and outside of the vehicle, e.g. respective inner and outer door handles. In addition, many vehicles also include an electrically controlled actuator for remotely locking and unlocking the door latches.

Automotive latches are increasingly performing complex functions with fewer motors. For example, it is desirable to perform a variety of latch functions with only one motor. In such cases, increased accurate motor control systems and methods are required in order properly electrically actuate the latch and obtain the desired operation. In order to enhance latching operations, it is often necessary that the latch assembly components, such as sliders and spring portions, function with sufficient force to trigger latching operations using intermediary elements and parts such as, for example, toggle levers and so forth. Conventional latch assemblies typically lack the necessary force to return sliders, for example, to their neutral positions, which can result in latch failure or at the very least, poor latch performance. It is believed that a solution to these problems involves the design and implementation of improved spring mechanisms utilized in latch assemblies.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved latch assembly.

It is another aspect of the present invention to provide for an improved slider return mechanism for use with such a latch assembly.

It is a further aspect of the present invention to provide for a scissor mechanism for controlling sliders utilized in a latch assembly.

The aforementioned aspects of the invention and other objectives and advantages can now be achieved as described herein. A scissor apparatus for a latch assembly is disclosed, which includes a spring comprising a plurality of fingers for controlling the motion one or more sliders associated with said latch assembly, wherein said spring comprises a spring control independent of the actuation of such sliders. The fingers are generally integrated with the spring. Such a one-piece spring can be implemented as a stamped component with 2-off, 3-off or 6-off fingers to control the motion of the sliders. The stamped spring can clip onto existing latch assembly components in order to promote retention, and overcome friction with the latch assembly and return the sliders to a neutral position thereof.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment and are not intended to limit the scope of the invention.

Figure 1:
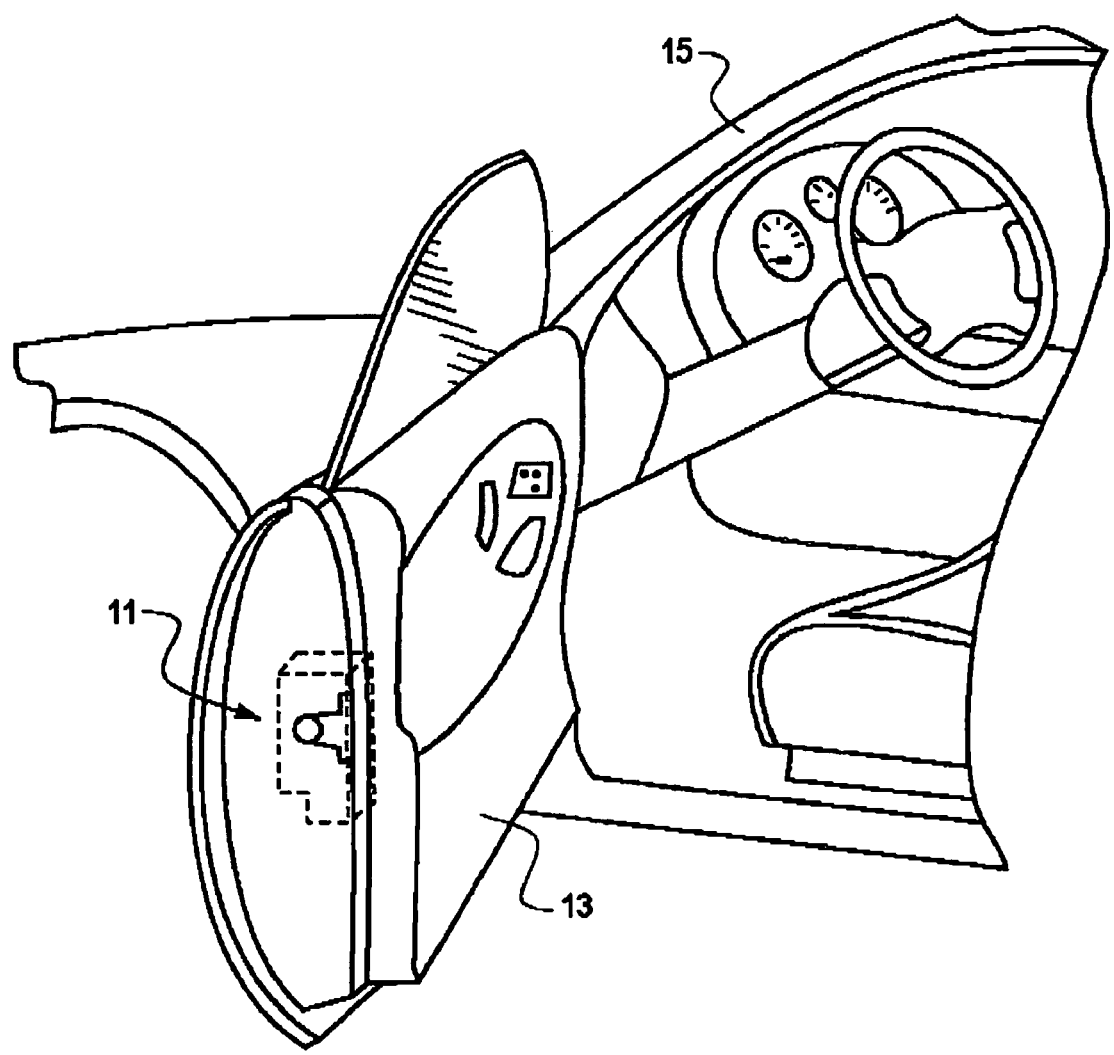
FIG. 1 illustrates a perspective view of a vehicle door mounted to a passenger vehicle in which a preferred embodiment can be implemented.

FIG. 1 illustrates a perspective view of a vehicle door 13 mounted to a passenger vehicle in which a preferred embodiment can be implemented. A vehicle, such as an automobile can be equipped with one or more individual door latch assemblies 11, which secure respective passenger and driver side doors to the vehicle 15. Each door latch assembly 11 is typically provided with manual release mechanisms or lever for unlatching the door latch from the inside and outside of the vehicle, e.g. respective inner and outer door handles.

In addition, many vehicles can also be equipped with electrically controlled actuators for remotely locking and unlocking the door latches. As indicated in FIG. 1, a door latch assembly 11 can be mounted to a driver's side vehicle door 13 of a passenger vehicle 15. The door latch assembly 11 may be mounted to front and rear passenger side doors thereof and may be incorporated into a sliding side door, rear door, a rear hatch or a lift gate thereof, depending upon design constraints.

Figure 2:
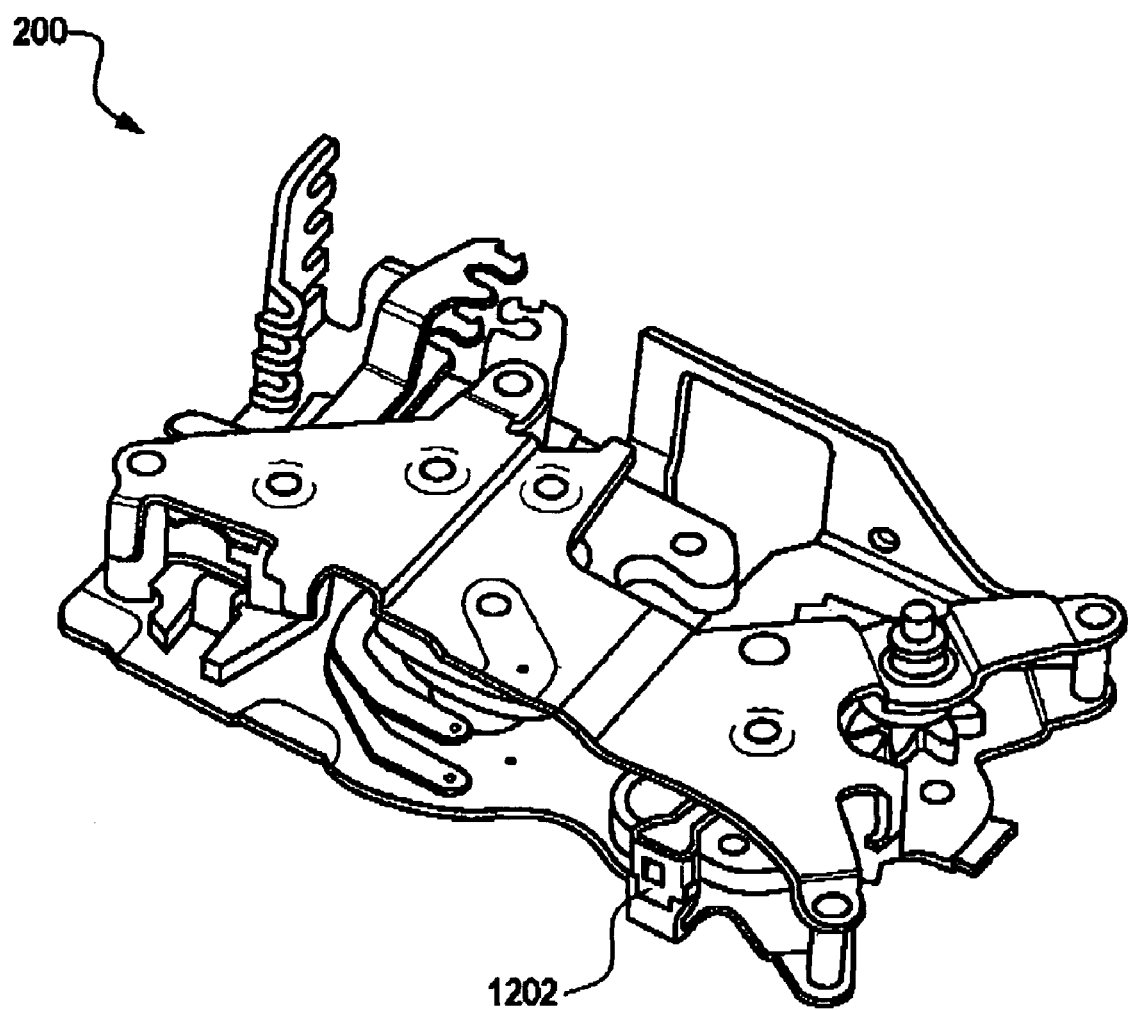
FIG. 2 illustrates a latch assembly, which can be adapted for use with the passenger vehicle depicted in FIG. 1.

FIG. 2 illustrates a latch assembly 200, which can be adapted for use with the passenger vehicle 15 depicted in FIG. 1. Latch assembly 200 can be integrated with and/or adapted for use with door latch assembly 11 depicted in FIG. 1. Latch assembly 200 includes a scissor spring 1202, which is explained in greater detail herein with respect to FIGS. 10-15.

Figure 3:
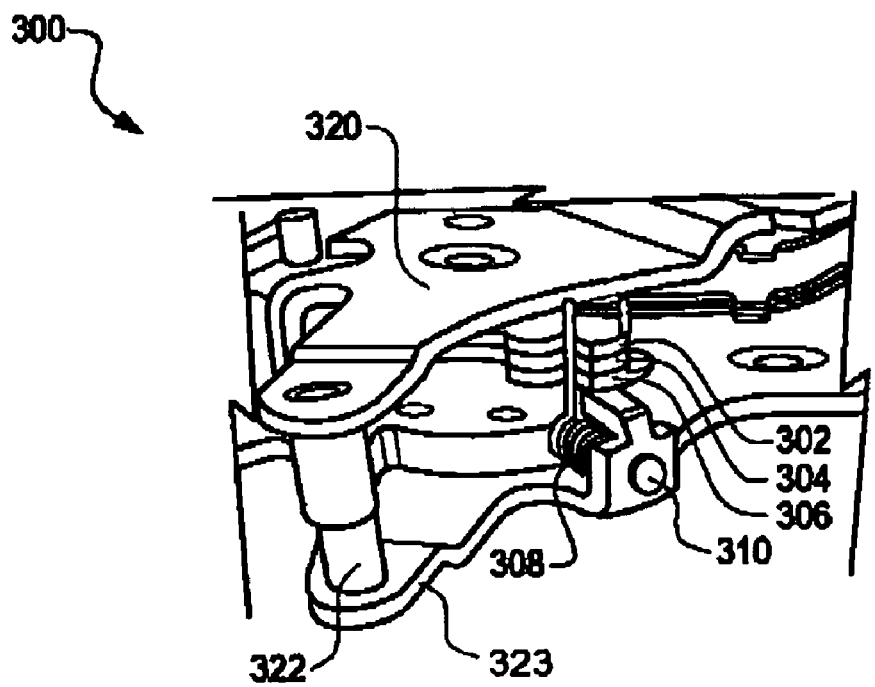
FIG. 3 illustrates a conventional latch assembly, including conventional sliders and a conventional spring and retention pin for use therewith.

FIG. 3 illustrates a conventional latch assembly 300, including conventional sliders 302, 304, 306 and a conventional spring 308. Sliders 302, 304, 306 and spring 308 are generally located between a metal plate 320 and a metal plate 323, which are maintained by one or more posts 322. Note that in FIGS. 3-4, identical or similar parts or elements are generally indicated by identical reference numerals.

Figure 4:
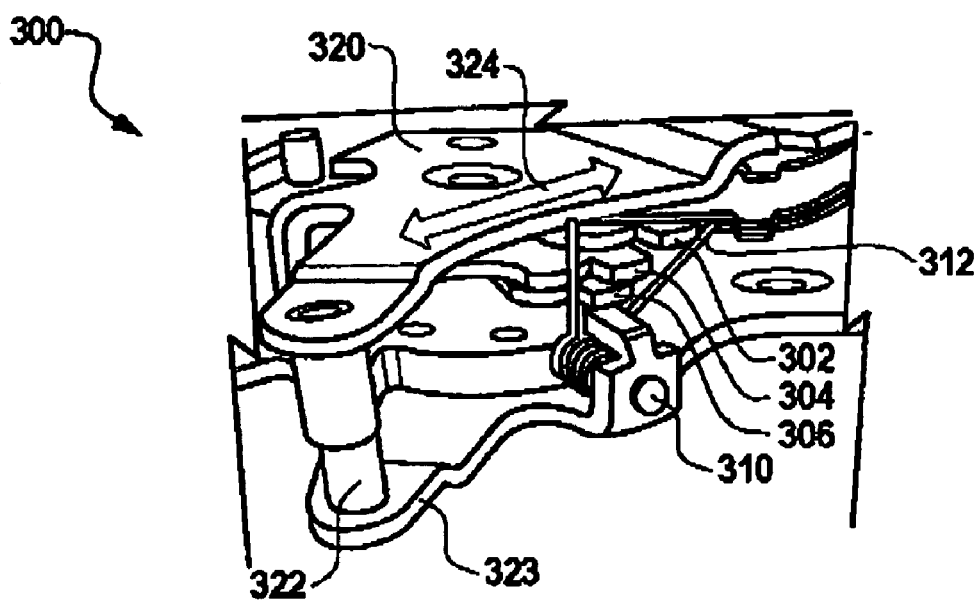
FIG. 4 illustrates a conventional slider actuation problem.

FIG. 4 illustrates therefore a conventional slider actuation problem associated with sliders 302, 304, 306 and spring 308 and retention pins 310. In the illustration of FIG. 4, arrow 324 generally refers to slider actuation. In the configuration depicted in FIG. 4, sliders 302, 304 and/or 306 have difficulty returning to their neutral position(s) and in some instances do not travel far enough to activate any associated toggle levers or pawl. One of the problems associated with the mechanism depicted in FIG. 4 is that slider 302, 304 and/or 306 can become jammed after independent actuation and does not return to its neutral position, which is shown in FIG. 3.

The spring mechanism, depicted in FIGS. 3-4 which includes spring 308 and retention pin 310 is mounted incorrectly, which generally causes sliders 302, 304, and/or 306 to tilt at an angle during their respective transfer functions, thereby reducing their effective travel. Their return travel is therefore intermittent due to the angle of the slider, which causes the slider to bind in its guide path due to the tangential force of the spring leg on spring 308. Thus, the force of spring 308 is insufficient to overcome the friction within the latch assembly 300 thereof to return the sliders 302, 304, 306 to their respective neutral positions.

Figure 5:
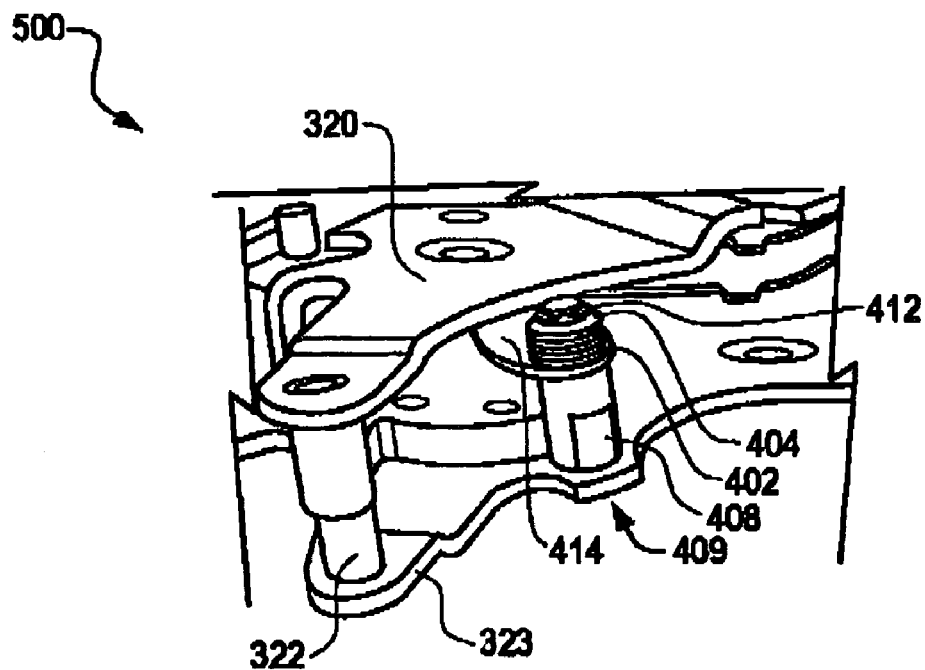
FIG. 5 illustrates a portion of a latch assembly including a scissor mechanism, in accordance with one embodiment.
Figure 6:
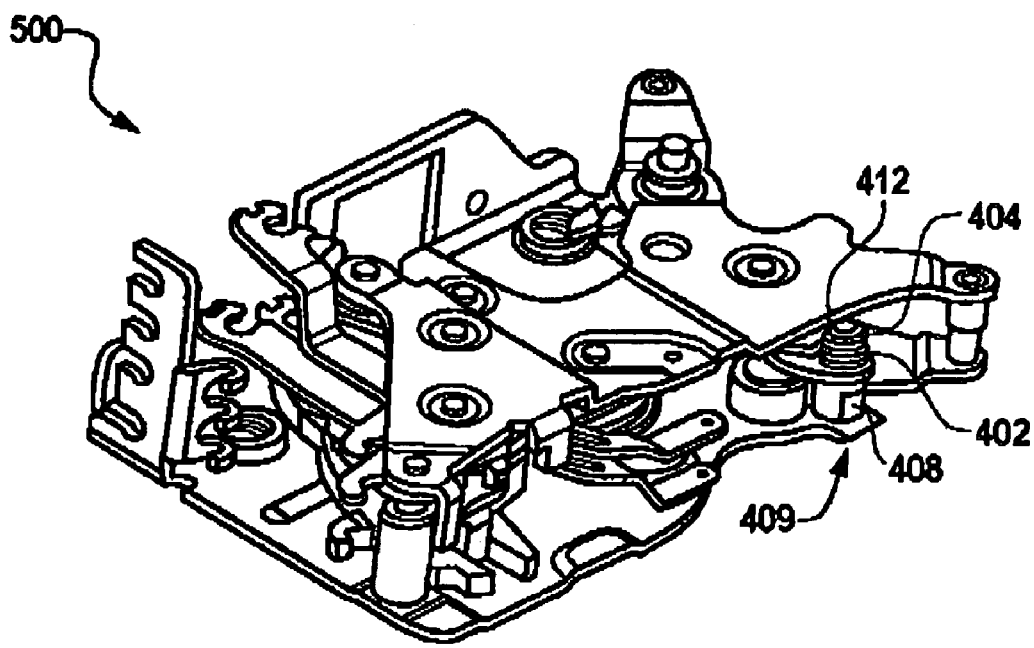
FIG. 6 illustrates a perspective view of a latch assembly, which can be implemented in accordance with one embodiment.
Figure 7:
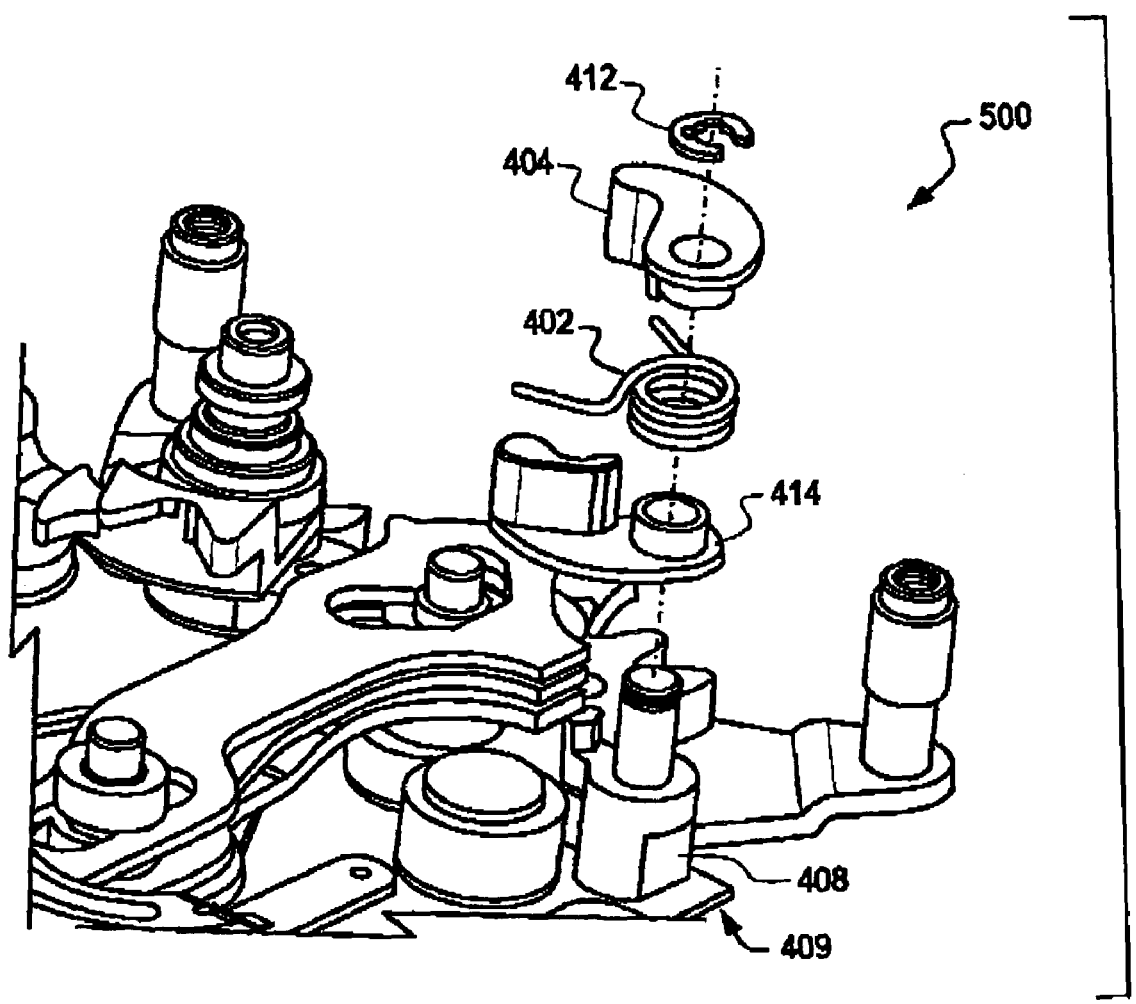
FIG. 7 illustrates an exploded view of a portion of the latch assembly depicted in FIGS. 5-6, in accordance with one embodiment.
Figure 8:
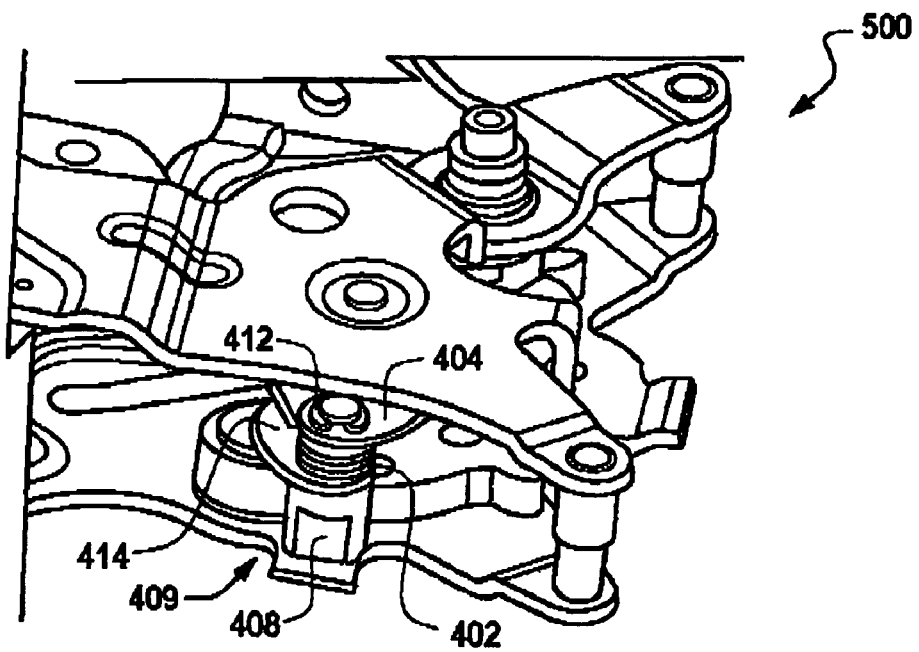
FIG. 8 illustrates a portion of a perspective view of the latch assembly depicted in FIGS. 5-7, in accordance with one embodiment.
Figure 9:
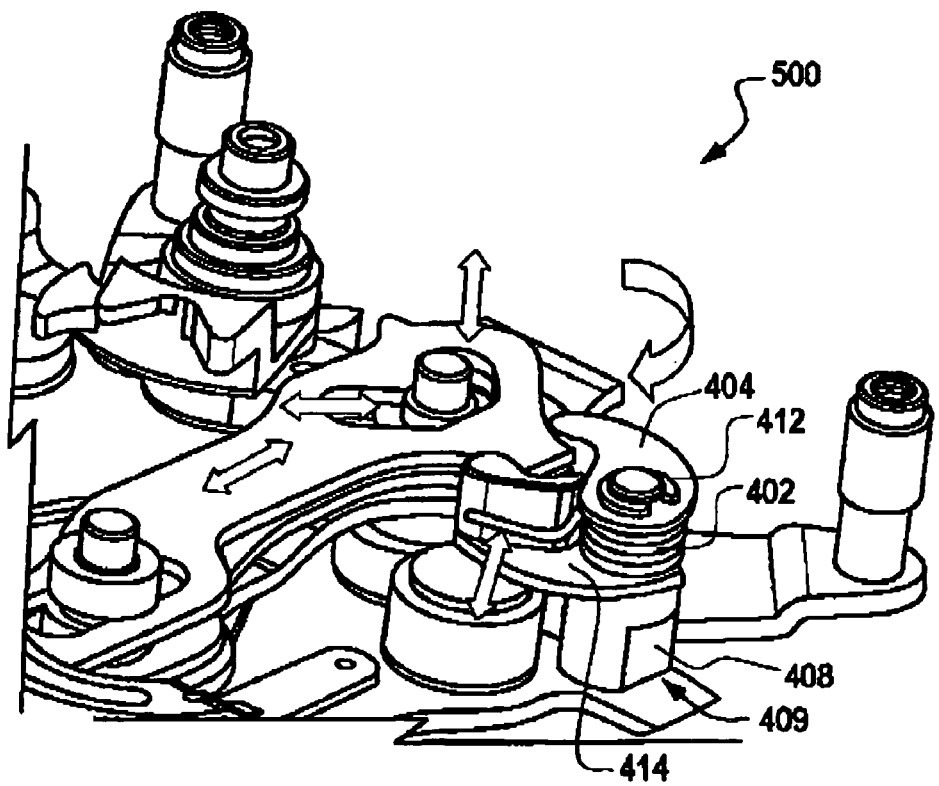
FIG. 9 illustrates actuation of the scissor mechanism depicted in FIGS. 5-8, in accordance with one embodiment.

FIG. 5 illustrates a portion of a latch assembly 500 including a scissor mechanism thereof, in accordance with one embodiment. FIG. 6 illustrates a perspective view of latch assembly 500, in accordance with one embodiment. Similarly, FIG. 7 illustrates an exploded view of a portion of latch assembly 500 depicted in FIGS. 5-6, in accordance with one embodiment. FIG. 8 illustrates a portion of a perspective view of the latch assembly 500 depicted in FIGS. 5-7, in accordance with one embodiment. FIG. 9 illustrates actuation of the scissor mechanism 409 depicted in FIGS. 5-8, in accordance with one embodiment. Note that in FIGS. 5-9, identical parts are indicated generally by identical reference numerals.

Latch assembly 500 is similar to latch assembly 300 discussed earlier, but differs from the latch assembly 300 in that latch assembly 500 incorporates scissor mechanism 409, which is generally composed of a scissor retention pin 408. Scissor mechanism 409 additionally includes a first scissor arm 404, which is located above a spring 402, which in turn is located over a second scissor arm 414. Scissor mechanism 409 also includes a circle clip 412 that engages scissor retention pin 408. Scissor mechanism 409 can be composed of 5-off parts, a spring 402, two arms 404, 414 (i.e., identical in design, reverse mount to give opposite hand), circle clip 412 and scissor retention pin 408. Spring mechanism 409 scissor arms 404 and 414 can be rotated during a transfer function of sliders 302, 304 or 306 associated with latch assembly 500. An example of such sliders is shown in greater detail herein with respect to FIGS. 14-15. The configuration depicted in FIGS. 5-9 thus eliminates the problems of sliders binding. The scissor retention pin 408 can be configured to incorporate an abutment to prevent the scissor arms 404, 414 and spring 402 from rotating fully during a slider transfer function. During a slider transfer function, only one of the scissor arms will rotate as they are both dependent on the travel direction of the sliders. During a typical transfer function, for example, a slider can act against a scissor arm, which in turn rotates and torques spring 402 as it acts against the other scissor arm. This scissor arm will be restricted from rotating as it acts against the abutment on the retention pin 408. Once the transfer function is complete, the spring force will return the scissor arm and slider to a neutral position.

Figure 10:
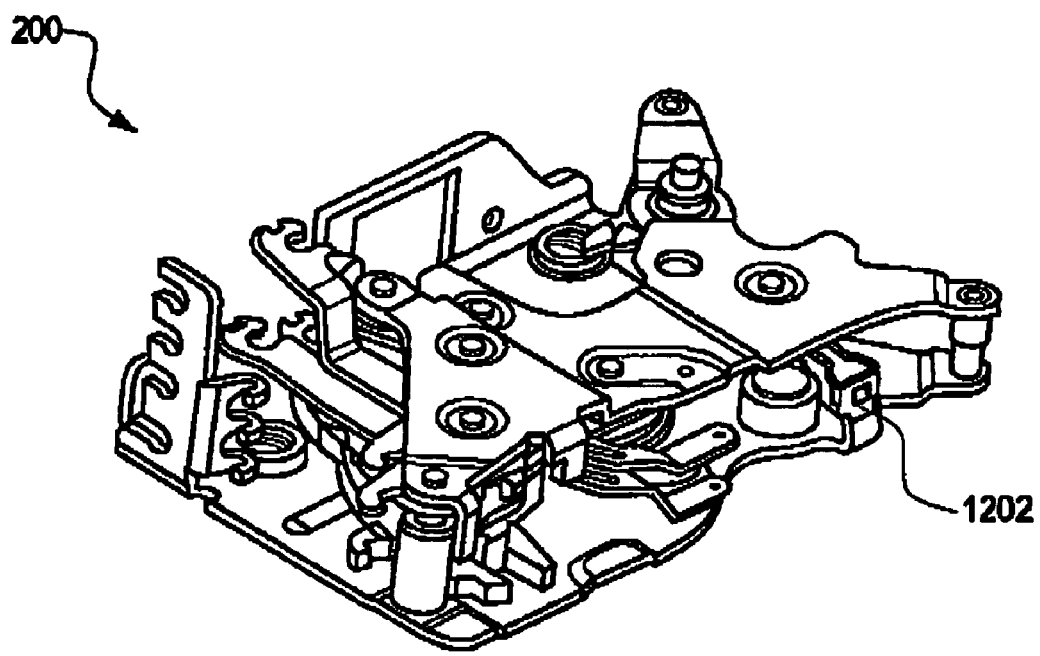
FIG. 10 illustrates the lower half of a latch assembly incorporating a scissor spring, in accordance with a preferred embodiment.
Figure 11:
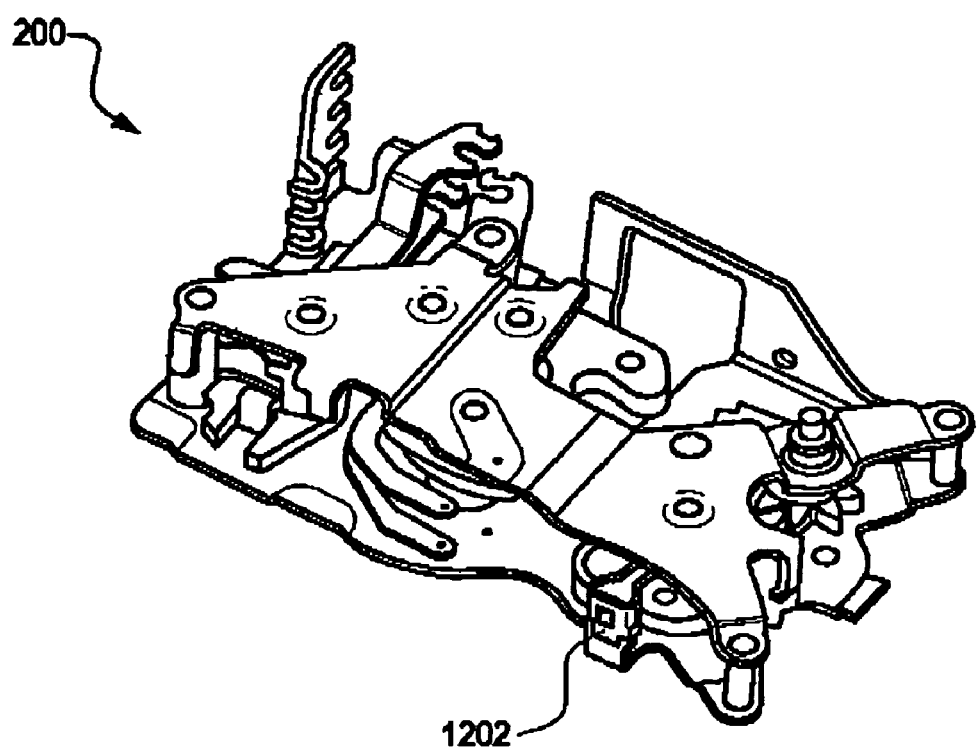
FIG. 11 illustrates a perspective view of the scissor spring of FIG. 10 mounted on a latch assembly, in accordance with a preferred embodiment.
Figure 12:
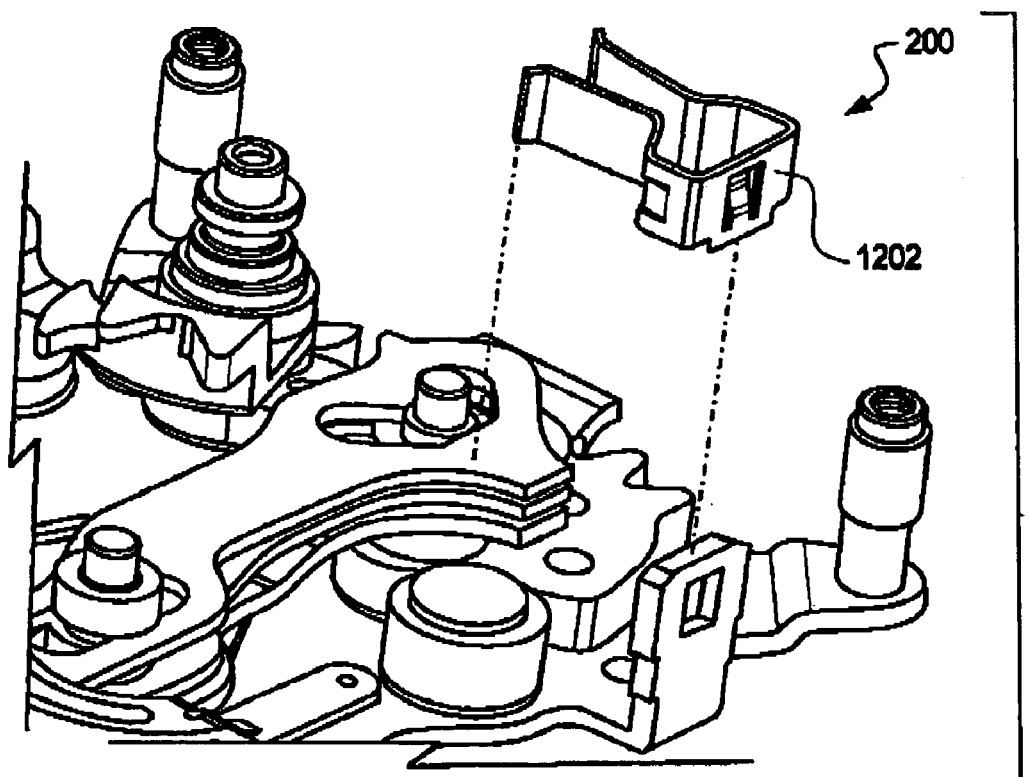
FIG. 12 illustrates a perspective view of the scissor spring depicted in FIGS. 10-11, in accordance with a preferred embodiment.
Figure 13:
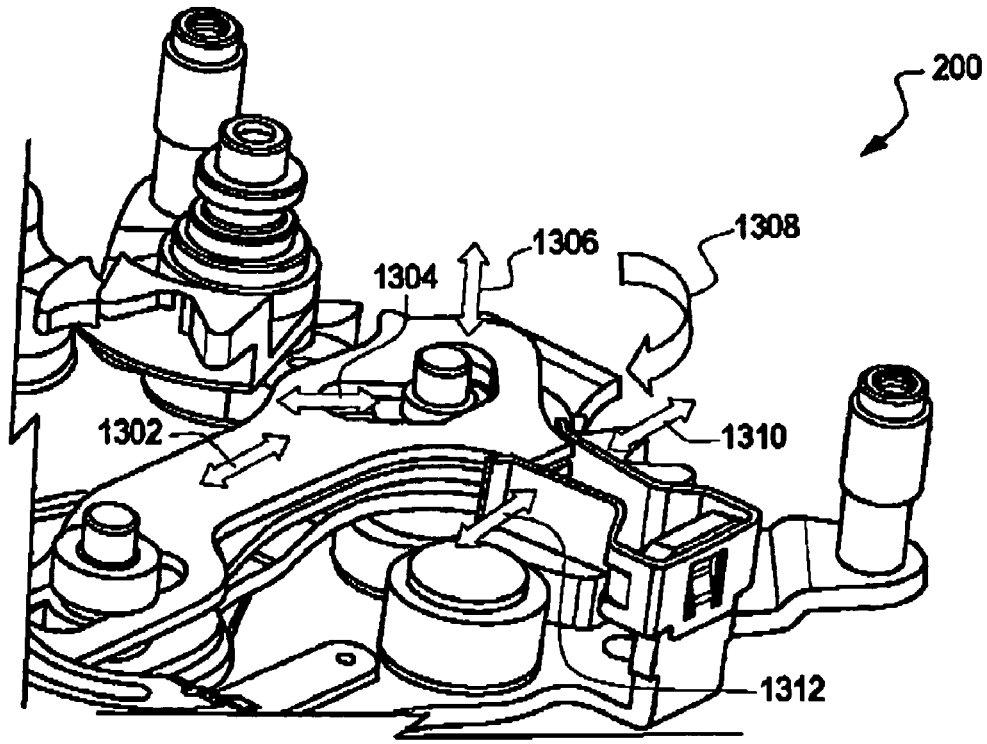
FIG. 13 illustrates scissor spring actuation, in accordance with a preferred embodiment.

FIG. 10 illustrates the lower half of latch assembly 200 incorporating a scissor spring 1202, in accordance with a preferred embodiment. FIG. 11 illustrates a perspective view of the scissor spring 1202 of FIG. 10 mounted on a latch assembly, in accordance with a preferred embodiment. FIG. 12 illustrates a perspective view of the scissor spring 1202 depicted in FIGS. 10-11, in accordance with a preferred embodiment. FIG. 13 illustrates scissor spring actuation, in accordance with a preferred embodiment. Note that in FIGS. 2 and 10-13, identical or similar parts or elements are generally indicated by identical reference numerals. In FIG. 13, for example, scissor spring actuation is indicated generally by arrows 1302, 1304, 1306, 1308, 1310 and 1312.

Figure 14:
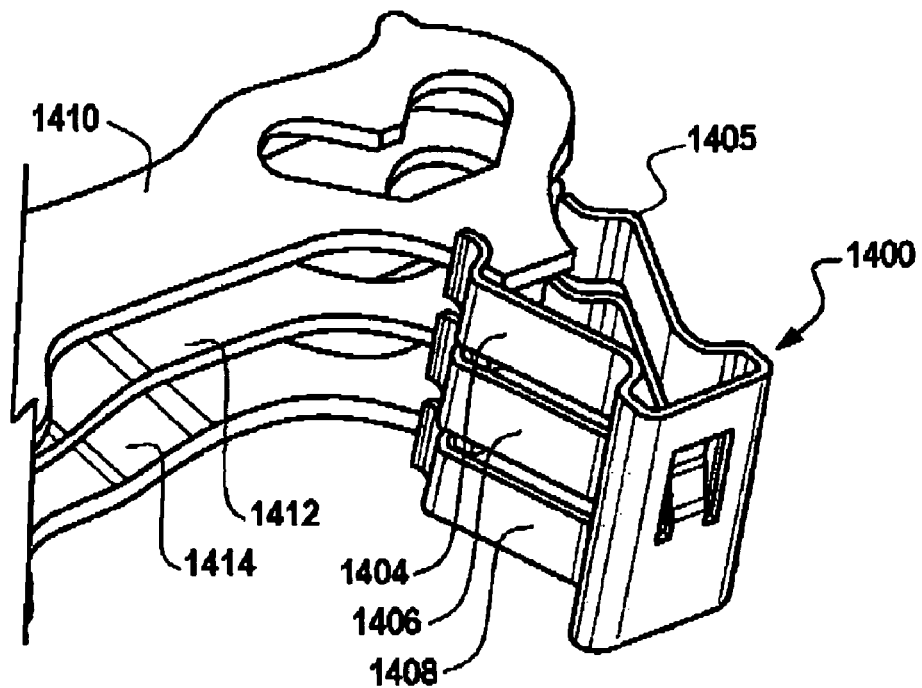
FIG. 14 illustrates a scissor spring, which can be implemented in accordance with an alternative embodiment.
Figure 15:
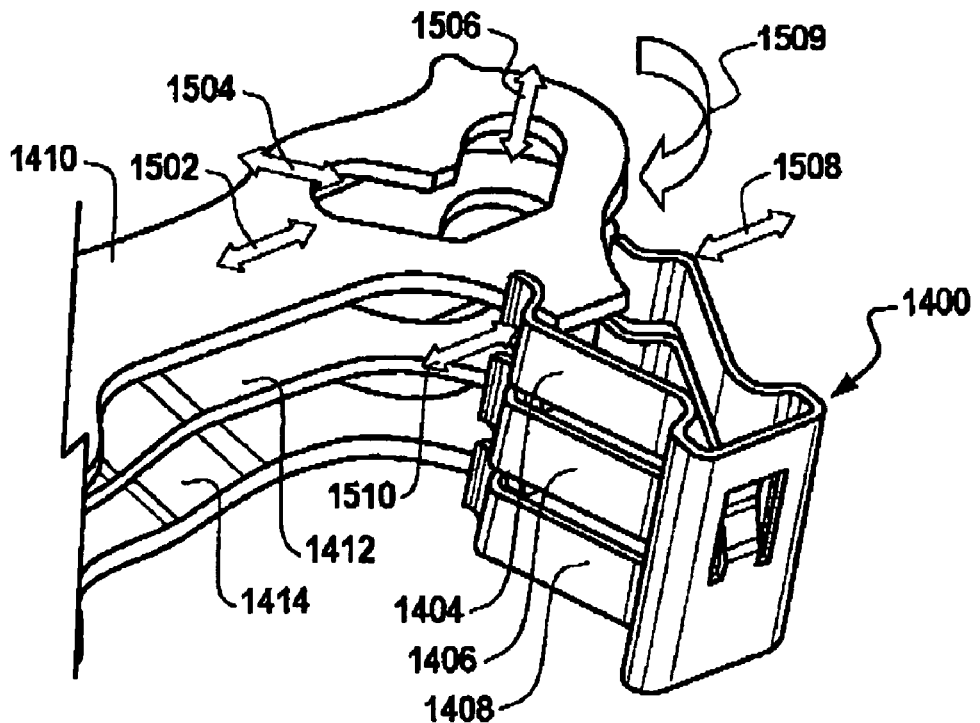
FIG. 15 illustrates a detailed view of a group of sliders that can be incorporated into a single piece scissor spring, which is independent of the control of slider actuation, in accordance with an alternative embodiment.

FIG. 14 illustrates a one-piece scissor spring 1400, which can be implemented in accordance with an alternative embodiment. FIG. 15 illustrates a detailed view of a group of sliders 1410, 1412, 1414 that can be adapted for use with single piece scissor spring 1400, which is independent of the control of slider actuation, in accordance with an alternative embodiment. Note that in FIGS. 14-15, identical or similar parts or elements are generally indicated by identical reference numerals. The one-piece scissor spring 1400 includes one or more spring fingers 1404, 1406, 1408, 1405 and so forth. Spring 1400 also includes a spring portion 1402, which is generally rectangular in shape.

Actuation of the one-piece scissor spring 1400 is generally indicated by arrows 1502, 1504, 1506, 1508 and 1510 in FIG. 15. The concept of a one-piece scissor spring 1400 was developed in order to aid in latch assembly production. Spring 1400 can, for example, be implemented as a stamped component with 2-off, 3-off or 6-off fingers (e.g., fingers 1404, 1406, 1408, 1405, etc) to control the motion of sliders 1410, 1412 and/or 1414. Such a stamped spring 1400 can clip into existing components within a latch assembly, such as, for example, latch assembly 200, in order to gain retention.

The various latch assemblies discussed herein, including components such as the one-piece scissor spring 1400, can be utilized not only in the context of automobiles and vehicles, but can be utilized with any automotive latch system. Examples of such latching systems include aircraft engines and associated systems, propulsion systems, navigation systems, air force avionic systems, aerospace electronics, auxiliary power systems and aircraft landing systems. The one-piece scissor spring 1400 can, for example, be adapted for use with latch assemblies involving a single motor to effect a number of independent electrical actuations, such as, for example, central locking, super locking, selective locking, power/electrical door opening (passive opening) and/or power/electrical door closing (soft closing). Latch assemblies can be adapted for securing any type of closure (side doors, trunks, rear doors, sing or sliding doors, etc) and can be designed to fit into any type of vehicle.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A system comprising:
   a latch assembly;
   a plurality of latch activation sliders disposed within said latch assembly wherein said plurality of latch activation sliders slide parallel to one another;
   a non-helical spring comprising a plurality of fingers, wherein at least one latch activation slider of said plurality of latch activation sliders acts against at least one finger of said plurality of fingers and wherein a return arm of each slider of said plurality of latch activation sliders travels between said plurality of fingers of said non-helical spring thereof.

2. The system of claim 1 wherein said non-helical spring comprises a single-component clip spring.

3. The system of claim 1 wherein said at least one finger of said plurality of fingers provides a force to return said at least one latch activation slider to a neutral position.

4. The system of claim 1 wherein said non-helical spring comprises a one-piece non-helical spring.

5. The system of claim 1 wherein said plurality of latch activation sliders provide independent activation.

6. The system of claim 1 wherein said non-helical spring is attached to said latch assembly by a retention clip on said non-helical spring.

7. The system of claim 2 wherein said plurality of fingers comprises two fingers.

8. A system comprising:
   a vehicle latch assembly;
   a plurality of latch activation sliders disposed within said latch assembly wherein said plurality of latch activation sliders slide parallel to each other;
   a non-helical clip spring comprising a plurality of fingers, wherein at least one latch activation slider of said plurality of latch activation sliders acts against at least one finger of said plurality of fingers and said at least one finger of said plurality of fingers provides a force to return said at least one latch activation slider to a neutral position and wherein a return arm of each slider of said plurality of latch activation sliders travels between said plurality of fingers of said non-helical clip spring thereof.

9. The system of claim 8 wherein said plurality of latch activation sliders are activated by electrical activation.

10. The system of claim 9 wherein said non-helical spring comprises a one-piece non-helical spring.

11. The system of claim 10 wherein said plurality of latch activation sliders provide independent activation.

12. The system of claim 11 wherein said non-helical spring is attached to said latch assembly by a retention clip on said non-helical clip spring.

13. The system of claim 12 wherein said plurality of fingers comprises two fingers.

14. A method comprising:
   providing a vehicle latch assembly;
   providing a plurality of latch activation sliders disposed within said latch assembly wherein said plurality of latch activation sliders slide parallel to each other;
   clipping a non-helical spring comprising a plurality of fingers to said vehicle latch assembly, wherein at least one latch activation slider of said plurality of latch activation sliders acts against at least one finger of said plurality of fingers;
   providing a force to return said at least one latch activation slider to a neutral position by said at least one finger of said plurality of fingers; and
   disposing a return arm of each slider of said plurality of latch activation sliders wherein said arm travels between said plurality of fingers of said non-helical spring thereof.

15. The method of claim 14 wherein said non-helical spring comprises a single component clip spring.

16. The method of claim 14 further comprising the step of activating said plurality of latch activation sliders electrically.

17. The method of claim 16 wherein said non-helical spring comprises a one-piece non-helical spring.

18. The method of claim 17 wherein said plurality of latch activation sliders provide independent activation.

19. The method of claim 18 wherein said plurality of fingers comprises two fingers.

* * * * *